(12) United States Patent
Toji

(10) Patent No.: US 7,606,476 B2
(45) Date of Patent: Oct. 20, 2009

(54) IMAGING DEVICE AND IMAGING METHOD

(75) Inventor: Shigeo Toji, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 281 days.

(21) Appl. No.: 11/656,515

(22) Filed: Jan. 23, 2007

(65) Prior Publication Data
US 2007/0172217 A1 Jul. 26, 2007

(30) Foreign Application Priority Data
Jan. 23, 2006 (JP) ............... 2006-013990

(51) Int. Cl.
*G03B 17/00* (2006.01)
*H04N 5/228* (2006.01)
(52) U.S. Cl. .................. 396/53; 396/55; 348/208.2; 348/208.4; 348/208.11; 348/208.15
(58) Field of Classification Search ............. 396/52–55; 348/208.99, 208.1, 208.2, 208.4, 208.5, 208.11, 348/208.14, 208.15, 169–172, 345, 352
See application file for complete search history.

(56) References Cited

FOREIGN PATENT DOCUMENTS

| JP | 5-137048 A | 6/1993 |
|---|---|---|
| JP | 5-249529 A | 9/1993 |
| JP | 2001-330882 A | 11/2001 |
| JP | 2002-214659 A | 7/2002 |

OTHER PUBLICATIONS

Translation of 2002-214659.*

* cited by examiner

*Primary Examiner*—Rochelle-Ann J Blackman
(74) *Attorney, Agent, or Firm*—Sughrue Mion, PLLC

(57) ABSTRACT

A face detector detects a person's face from a through image. When the face is not found, and a shutter button is pressed fully, a correction lens is moved in the direction and at the speed to offset a camera shake detected by an angular velocity sensor and a still image is shot. When the face is found, and the shutter button is pressed halfway, a motion vector detector reads two through images from a SDRAM to detect a subject shake. During the shooting of the still image by full press of the shutter button, the correction lens moves in the direction and at the speed to offset the subject shake.

17 Claims, 4 Drawing Sheets

IMAGING DEVICE AND IMAGING METHOD

FIELD OF THE INVENTION

The present invention relates to an imaging device, and more particularly relates to an imaging device and imaging method capable of correcting a camera shake and a subject shake.

BACKGROUND OF THE INVENTION

Recent imaging devices, for example a digital camera are provided with a function for preventing a camera shake. For example, a camera disclosed in Japanese Patent Laid-open Publication No. 05-249529 includes a camera shake correction lens that is movable in a plane perpendicular to an optical axis, a lens position detector for detecting a decentering amount of the camera shake correction lens decentered from the optical axis, and a display for displaying a direction in/to which the camera should be moved so that the decentering amount becomes zero. On releasing, the camera shake correction lens is set not near an end of a correcting range and a camera shake is suppressed. Moreover, a video camera disclosed in Japanese Patent Laid-open Publication No. 05-137048 detects a motion vector by the representative point matching method and corrects a camera shake based on the motion vector.

The camera disclosed in the Japanese Patent Laid-open Publication No. 05-249529 is capable of correcting the camera shake, but disadvantageously it is not capable of detecting and correcting a subject shake (shake due to motion of the subject). The video camera disclosed in the Japanese Patent Laid-open Publication No. 05-137048 is capable of detecting the subject shake, but disadvantageously it is not capable of sufficiently correcting the camera shake because of delay of the shake detection resulting from that the motion is estimated after an image is retrieved.

SUMMARY OF THE INVENTION

An object of the present invention is to provide an imaging device and an imaging method capable of correcting both of a camera shake and a subject shake.

Another object of the present invention is to provide an imaging device and an imaging method that prioritize the camera shake correction when a people picture is captured.

To achieve the above object and other objects, an imaging device of the present invention is provided with a camera shake detector for detecting a camera shake based on a motion of the imaging device, a subject shake detector for detecting a subject shake by comparing a first through image with a second through image which are shot at different time, a controller for selecting either of the camera shake detector or the subject shake detector, and a correction section for correcting shake by moving a part of the imaging optical system in a plane perpendicular to an optical axis during shooting of the still image according to the camera shake or the subject shake selected by the controller.

In a preferred embodiment of the present invention, the subject shake detector detects a positional change of a particular image as a moving vector. An angular velocity sensor is used for the camera shake detector. The imaging device is provided with a face detector for detecting a person's face found in the through image. The controller selects the subject shake detector when the face detector detects the person's face, and the controller selects the camera detector when the face detector does not detect the person's face. The face detector detects both eyes of the person found in flesh color areas and determines one of the flesh color areas surrounding the both eyes as the person's face.

The person's face is detected before the shutter button is pressed halfway, the camera shake or the subject shake is detected when the shutter button is pressed halfway, and the still image is shot when the shutter button is fully pressed.

An imaging method of the present invention is provided with a step of detecting a camera shake based on a motion of an imaging device, a step of detecting a subject shake by comparing a first through image with a second through image which are shot at different time, a step of detecting a person's face found in the through image, a step of selecting the subject shake detection when the person's face is detected and selecting the camera shake detection when the person's face is not detected, and a step of correcting shake by moving a part of an imaging optical system in a plane perpendicular to an optical axis during shooting of the still image according to the selected one of the camera shake or the subject shake.

According to the present invention, both of the camera shake and the subject shake can be corrected. Moreover, in the present invention, the camera shake detector is normally used to detect the camera shake, and when the person's face is found, the camera shake detector is shifted to the subject shake detector. Therefore, the camera shake and the subject shake can be effectively corrected.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
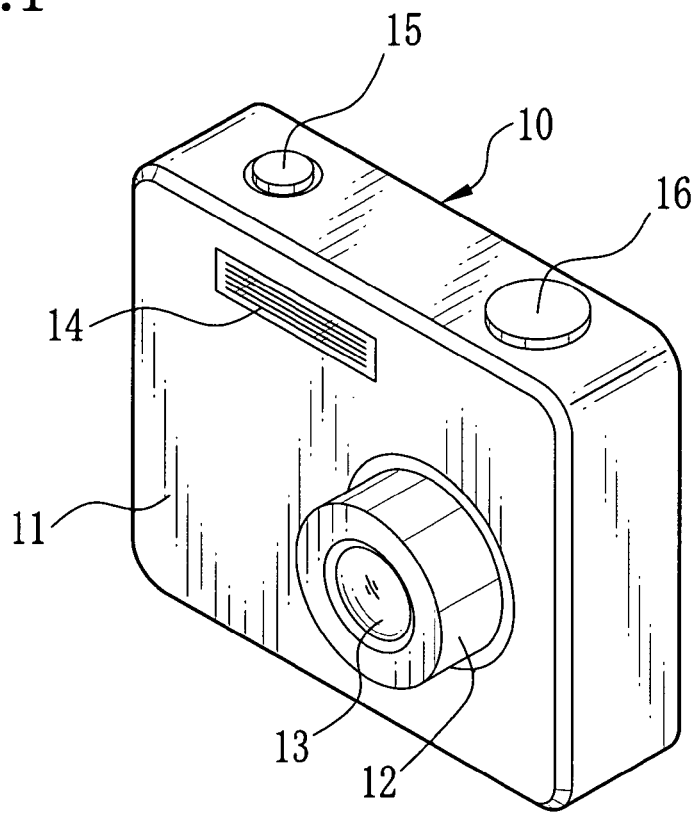
FIG. 1 is a front perspective view showing a digital camera.

In FIG. 1, a digital camera 10 includes a camera body 11 whose front face is provided with a lens barrel 12 of collapsible mount type. The lens barrel 12 holds a taking lens 13 that is a zoom lens. A flash emitter 14 is disposed at an upper front face of the camera body 11.

An upper face of the digital camera 10 is provided with a shutter button 15 and an operating dial 16. The operating dial 16 turns on/off a power switch and shifts modes among a still image shooting mode, a moving image shooting mode, a reproduction mode, and a setting mode. The moving image shooting mode allows, for example continuously shooting of still images at a speed of 30 frames per second to record a movie of up to 3 minutes.

Figure 2:
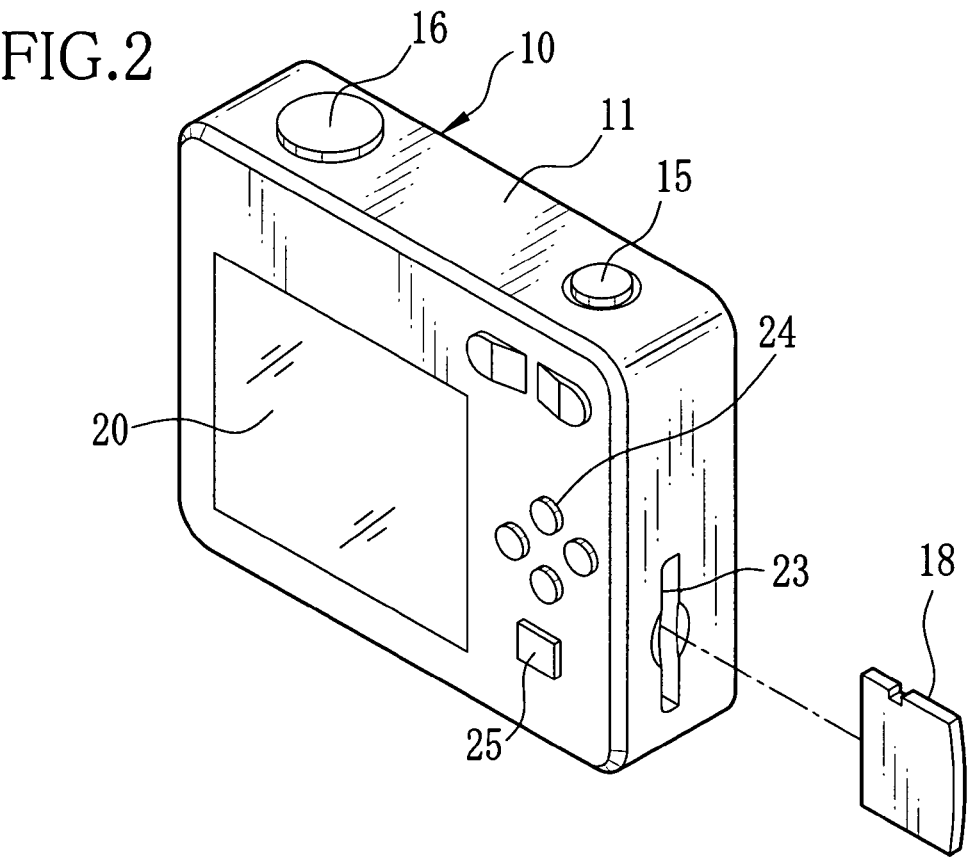
FIG. 2 is a rear perspective view showing the digital camera.

In FIG. 2, a back face of the digital camera 10 is provided with a liquid crystal display (LCD) 20. In the still image shooting mode and the moving image shooting mode, the LCD 20 functions as an electronic view finder and displays a through image in real time. In the reproduction mode, image data of the still image and the moving image is read out from a memory card 18 and the still image and the moving image are reproduced and displayed on the LCD 20. Moreover, in the setting mode, various setting screens are displayed on the LCD 20.

The memory card 18 is detachably loaded into a memory card slot 23 that is provided on a side face of the digital camera 10. Image data obtained in the shooting modes is written in the memory card 18. Cursor buttons 24 are used for a change over of settings and also for operation onto various processing screens displayed on LCD 20. An enter button 25 is used for executing a process selected by the cursor buttons 24.

Figure 3:
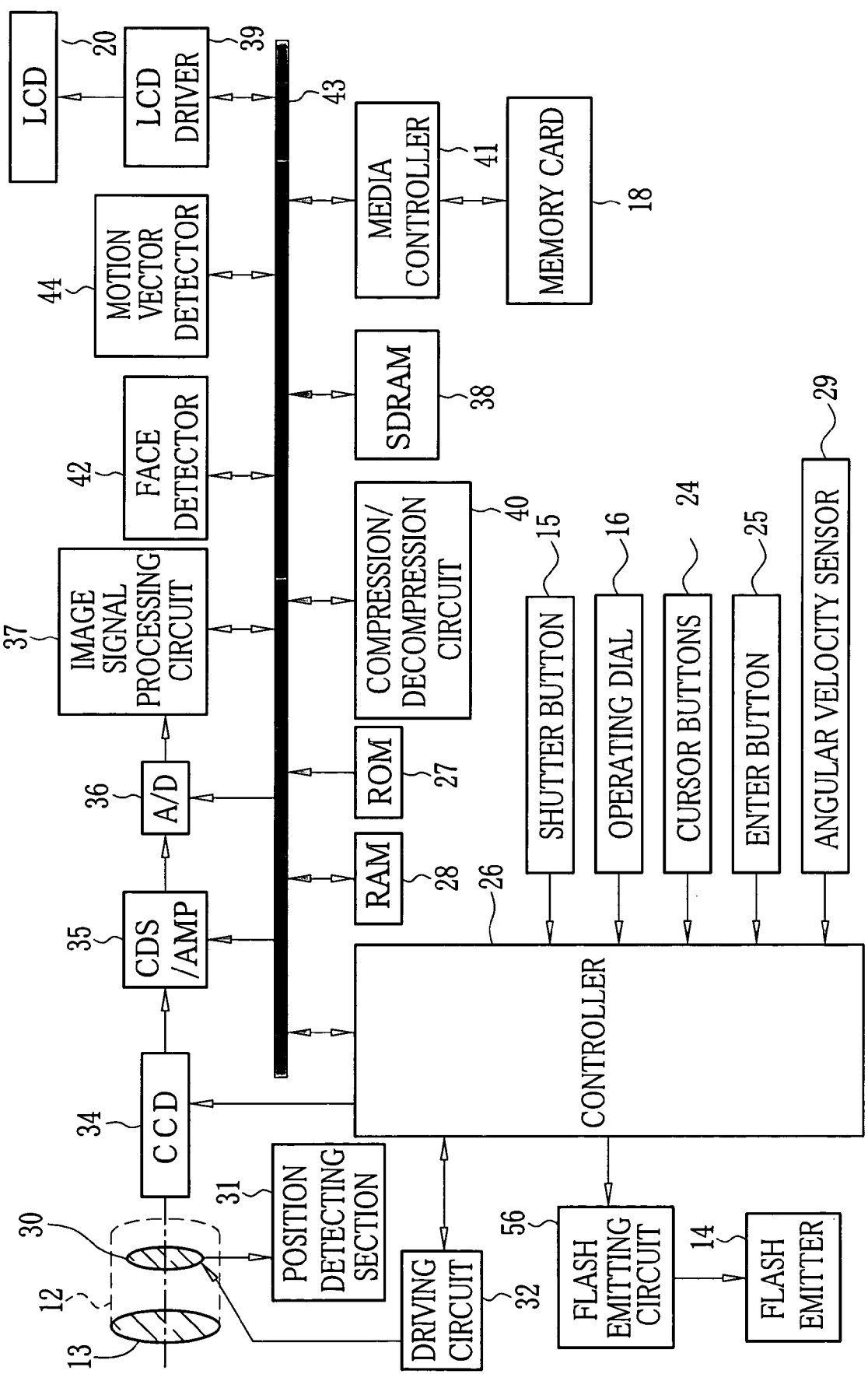
FIG. 3 is a block diagram showing an electrical configuration of the digital camera.

In FIG. 3 showing an electrical configuration of the digital camera 10, a controller 26 reads out a sequence program written in a ROM 27 to a RAM 28 that is a work memory and executes it. The controller 26 controls each part of the digital camera 10 according to an operation signal generated by user's operation to the shutter button 15, the operating dial 16, the cursor buttons 24 and the enter button 25. Moreover, a camera shake detection signal from angular velocity sensors 29 functioning as a camera shake detector is fed into the controller 26.

The taking lens 13 in the lens barrel 12 includes a correction lens 30 for correcting shake. The correction lens 30 is held by a lens holder (not shown) as is generally known. The lens holder is moved in X or Y direction in a plane perpendicular to an optical axis by a known two-dimensional moving mechanism (not shown). Small permanent magnets are attached to the lens holder and hall elements (not shown) are attached to a fixed portion of the two-dimensional moving mechanism. Signals from the hall elements in the X and Y direction are fed into a position detecting section 31. Moreover, actuators (not shown) for moving the correction lens 30 in the X and Y direction in the plane perpendicular to the optical axis are incorporated in the lens barrel 12 and driven by a driving circuit 32.

The controller 26 drives the driving circuit 32 during the shooting of the still image, based on camera shake detection signals from the angular velocity sensors 29 and a lens position signal from the position detecting section 31 and moves the correction lens 30 in a direction and at a speed to offset the camera shake in the X and Y direction. Moreover, the controller 26 moves the correction lens 30 to offset a motion vector $\alpha$ (subject shake) that is detected by a motion vector detector 44 functioning as an after-mentioned subject shake detector.

A CCD 34 (image sensor) is disposed behind the taking lens 13. When the through image is displayed, an imaging signal of a field image (even field or odd field) is read out from the CCD 34 and fed into a CDS/AMP circuit 35. The CDS/AMP circuit 35 includes a correlation double sampling circuit (CDS) and an amplifier (AMP). The CDS generates an analog image signal of red, green and blue colors from the signal supplied from the CCD 34. The AMP amplifies the analog image signal of red, green and blue colors. An A/D converter 36 converts the analog image signal supplied from the CDS/AMP circuit 35 into image data that is a digital image signal.

The image data supplied from the A/D converter 36 is fed into an image signal processing circuit 37, where a gradation conversion, a white balance correction, a $\gamma$ correction are executed. Subsequently, the image data is converted into YC data and temporarily stored in a SDRAM 38 through a data bus 43. The YC data read out from the SDRAM 38 is sent to the LCD 20 through an LCD driver 39 and the through image is displayed on the LCD 20. The SDRAM 38 has a divided memory each of which memorizes one of two consecutive field images, where the first field image is written while the second field image is being read.

During display of the through image, an AF control and an AE control are performed at periodic intervals. In the AF control, a focus lens constituting the taking lens 13 is moved to find an in-focus position where a contrast (value obtained by integrating the difference of Y data (luminance data) between the adjacent pixels) becomes maximum, and the focus lens is then set to the in-focus position. In the AE control, an average value of the luminance data is calculated and a stop in the taking lens 13 is controlled based on the average value.

When the shutter button 15 is pressed halfway after framing, a switch S1 (not shown) turns on. When the switch S1 turns on, AE photometry for shooting is carried out to determine an exposure time and an aperture value. Next, the AF control is carried out.

When the shutter button 15 is pressed fully, a switch S2 (not shown) turns on. Firstly, the stop is set to the aperture value determined through the AE photometry, secondly a remaining charge in the CCD 34 is forcibly drained to start photo-electrical conversion of the CCD 34. When the predetermined exposure time passes, the shutter actuates to stop the photo-electrical conversion of the CCD 34.

After the shutter closes, a frame image is read out from the CCD 34. The frame image is subjected to image processing (A/D conversion, $\gamma$ correction, white balance correction, sharpness process, YC conversion and others) in the image signal processing circuit 37 in the A/D converter 36 and the CDS/AMP circuit 35, and then it is written in the SDRAM 38.

Subsequently, the image data of the frame image is read out from the SDRAM 38 and compressed in a predetermined compression format such as JPEG format by a compression/decompression circuit 40, and then it is written in the memory card 18 through a media controller 41.

When the through image is displayed, the image data of the through image (field image) written in the SDRAM 38 is read into a face detector 42 to detect a person's face. Next, a face detection will be shortly described. The face detector 42 extracts the person's face by extracting both eyes of the person from the image data of the through image (hereinafter referred to as an through image data).

As a previous step for extracting the person's both eyes, the image of the through image data is divided into a grid shape (for example, 16×16), and the divided areas with many flesh color pixels estimated as a skin are selected based on a signal level of red, green and blue colors in each divided area.

Further, areas having white color pixels estimated as a white of the eyes and black color pixels estimated as a pupil of the eyes are selected from the divided areas with many flesh color pixels to obtain the position coordinates of the person's both eyes in the image. Then, the face position is determined with a midpoint of the eye's position coordinates being as a representative point. The face detector 42 regards the divided areas with many flesh color pixels around the person's both eyes as a face area, based on the position coordinates of the extracted person's both eyes.

Figure 4A:
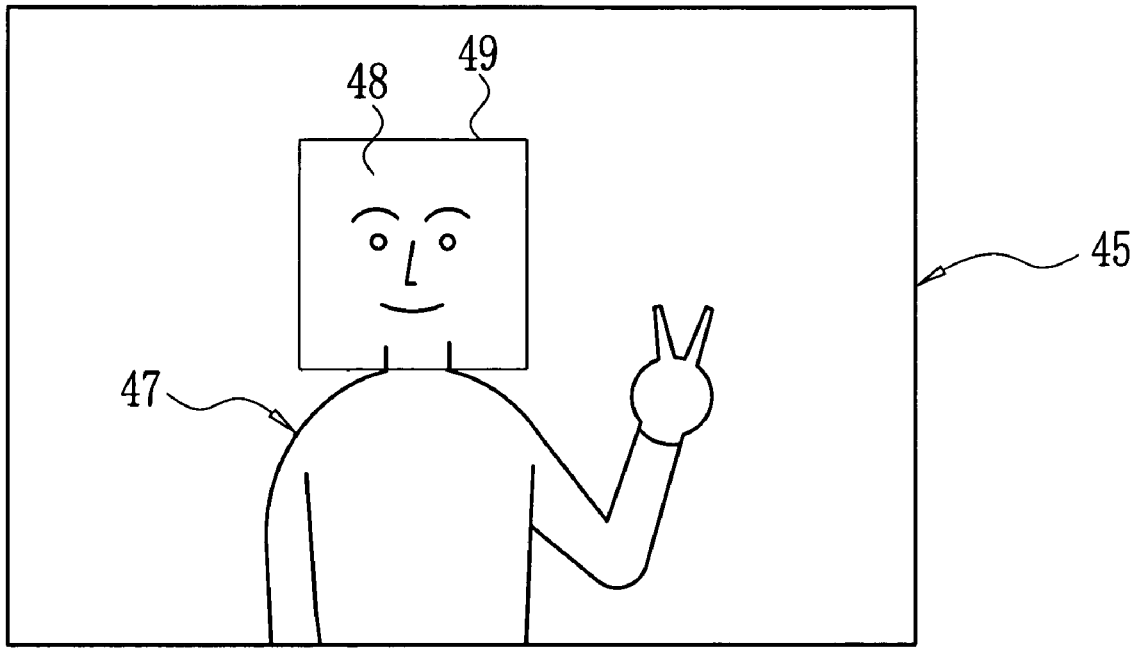
FIGS. 4A and 4B are explanatory views showing detection of a subject shake.
Figure 4B:
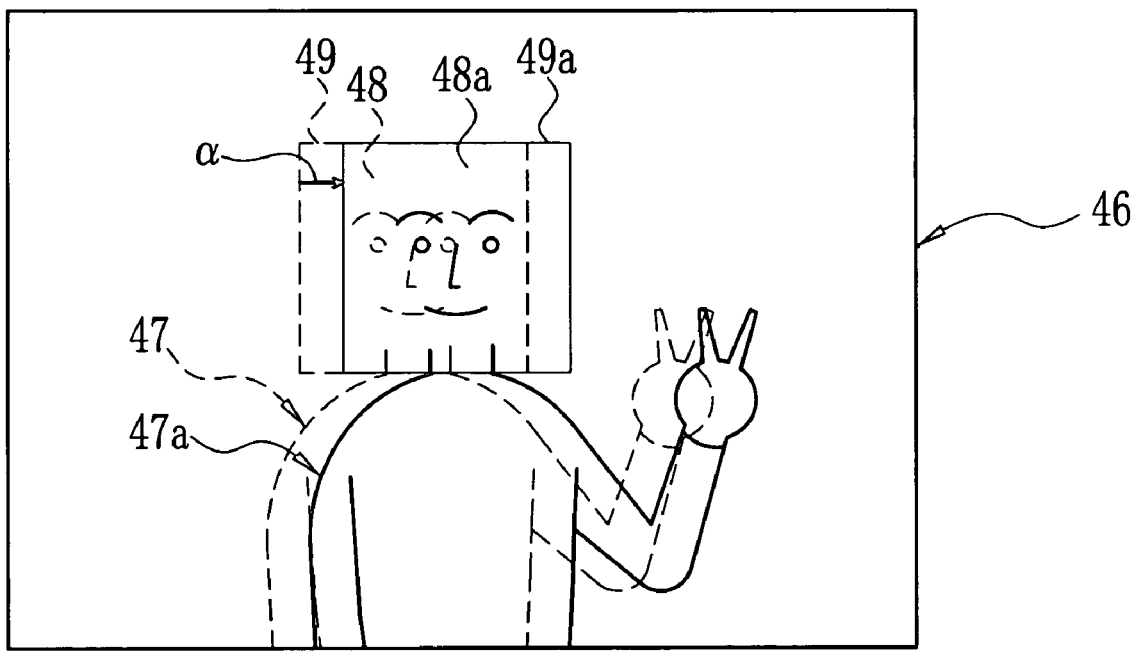

When the face detector 42 detects the person's face, the controller 26 stops the detection of the camera shake by the angular velocity sensors 29 and sends out a command signal to the motion vector detector 44. The motion vector detector 44 reads out two through images 45 and 46 from the SDRAM 38, which are read in tandem from the CCD 34, and compares them as shown in FIGS. 4A and 4B. It is noted that FIGS. 4A and 4B show a walking person 47, for example.

The motion vector detector 44 sets a block 49 centered around a face 48 of the person 47, and detects a motion vector α (subject shake) for the face 48 of the person 47 shifting to a face 48a of a subject 47a (the block 49 moves to a block 49a) by using the known block-matching algorithm. The controller 26 moves the correction lens 30 so that the motion vector α is offset during the shooting of the still image. The subject shake is therefore corrected.

When luminance of the person 47 is lower than a predetermined value, the controller 26 drives a flash light emitting circuit 56 to make the flash emitter 14 emit light.

Figure 5:
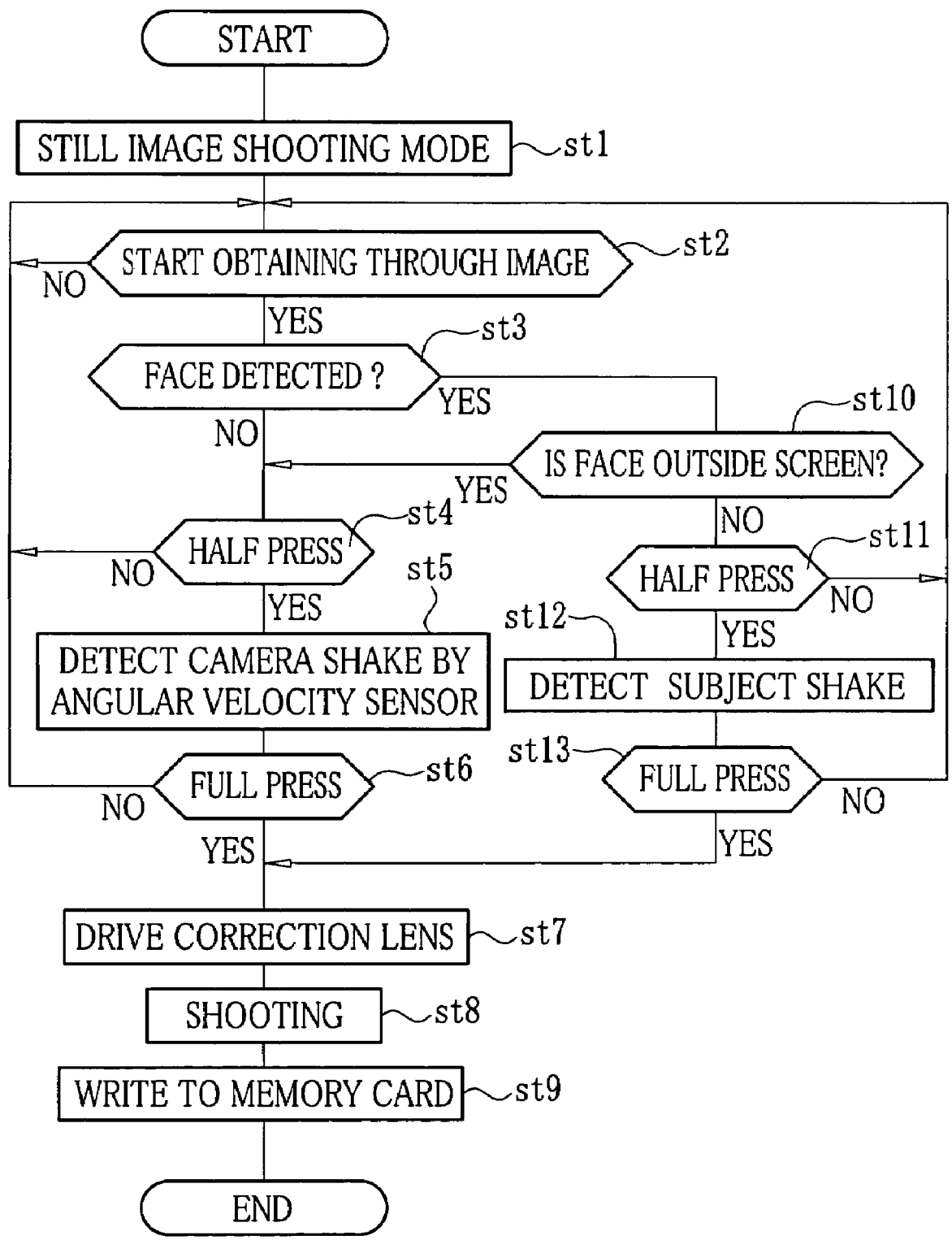
FIG. 5 is a flow diagram showing a process of correcting shake.

Next, operation of the digital camera 10 will be described in reference to a flow chart of FIG. 5. For shooting the still image by the digital camera 10, the operating dial 16 is operated to turn on the power of the digital camera 10 and to select the still image shooting mode (step (hereinafter referred to as st) 1). Then, a through image obtainment starts (st2).

The through image written in the SDRAM 38 is read in the face detector 42 to detect the face of the person 47 (st3). When the face 48 of the person 47 is not detected by the face detector 42 and the shutter button 15 is pressed halfway (st4), the AE photometry is carried out to determine combination of the stop and the shutter speed. Concurrently, ranging for AF control is carried out, and the camera shake detection signals from the angular velocity sensors 29 are fed into the controller 26 (st5).

Subsequently, when the shutter button 15 (st6) is pressed fully, the correction lens 30 is moved in the direction and at the speed to offset the camera shake. During the move of the correction lens 30, a still image is shot under a pre-calculated exposure condition (st8).

The exposed still image is subjected to various image processings of the image signal processing circuit 37, the CDS/AMP circuit 35 and the A/D converter 36. The still is then compressed in the compression/decompression circuit 40, and written in the memory card 18 through the media controller 41 (st9).

When the face 48 of the person 47 is detected by the face detector 42 in step 3 (st3) and the face 48 is not outside the screen of the through image (st10), the controller 26 switches the camera shake detection by the angular velocity sensors 29 to the subject shake detection by the motion vector detector 44.

When the shutter button 15 is pressed halfway (st11), combination of the stop and the shutter speed is determined, and the ranging is carried out. Concurrently the motion vector detector 44 reads two through image data from the SDRAM 38 and detects motion vector α (subject shake amount) (st12).

Subsequently, when the shutter button 15 (st13) is pressed fully, the correction lens 30 moves in the direction and at the speed to offset the subject shake (st7). During the move of the correction lens 30, the still image is shot by the CCD34 (st8).

The still image is written in the memory card 18 (st9) after the various image processings. It is noted that the subject shake correction leads an image to have a seemingly moving background behind/with a stationary main subject.

When the face 48 of the person 47 is detected, the subject shake is detected using the motion vector detector 44, but when the face 48 of the person 47 moves outside the screen of the through image (st10) during the shooting, the controller 26 switches the subject shake detection by the motion vector detector 44 to the camera shake detection by the angular velocity sensors 29.

In the above-mentioned embodiment, two consecutive through images are read from the SDRAM for detecting the motion vector, but the present invention is not limited to this. Many through images may be written in the SDRAM and two in consecutive images may be read from the SDRAM at a predetermined time intervals. The present invention may be provided with a switch for manually shifting the camera shake and the subject shake. Moreover, the above embodiment is explained with the digital camera, but the present invention is not limited to this and is also applicable to a mobile phone with a camera and a PDA with a camera.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging device that includes an imaging optical system and an image sensor for converting an image formed by the imaging optical system into an electric signal, said image sensor taking a through image prior to shooting a still image, said imaging device comprising:
   a camera shake detector for detecting a camera shake based on a motion of said imaging device;
   a subject shake detector for detecting a subject shake by comparing a first through image with a second through image which are shot at different time;
   a controller for selecting either of said camera shake detector or said subject shake detector; and
   a correction section for correcting shake by moving a part of said imaging optical system in a plane perpendicular to an optical axis during shooting of said still image according to said camera shake or said subject shake selected by said controller.

2. An imaging device as claimed in claim 1, wherein said subject shake detector detects a positional change of a particular image as a moving vector.

3. An imaging device as claimed in claim 2, further including a face detector for detecting a person's face found in said through image, wherein said controller selects said subject shake detector when said face detector detects the person's face and wherein said controller selects said camera shake detector when said face detector does not detect the person's face.

4. An imaging device as claimed in claim 3, wherein said face detector detects both eyes of the person found in flesh color areas and determines one of said flesh color areas surrounding said both eyes as said person's face.

5. An imaging device as claimed in claim 3, further including a shutter button, wherein said person's face is detected prior to a halfway press of said shutter button, wherein said camera shake or said subject shake is detected when said shutter button is pressed halfway, and wherein said still image is shot when said shutter button is fully pressed.

6. An imaging device as claimed in claim 3, wherein said camera shake detector is an angular velocity sensor.

7. An imaging device as claimed in claim 3, wherein said controller selects said subject shake detector to perform a shake detection, instead of selecting said camera shake detector to perform said shake detection, only when said face detector detects the person's face, and said controller selects said camera shake detector to perform said shake detection when said face detector does not detect the person's face.

8. An imaging device as claimed in claim 3, wherein a shake detection is performed by said subject shake detector instead of being performed by said camera shake detector only when the person's face is detected by said face detector, and the shake detection is performed by said camera shake detector only when said face detector does not detect the person's face.

9. An imaging device as claimed in claim 8, wherein said camera shake detector does not perform the detecting of the camera shake when said face detector detects the person's face.

10. An imaging device as claimed in claim 8, wherein when said face detector detects the person's face and said controller selects said subject shake detector, said controller switches and selects the camera shake detector to perform the shake detection instead of being performed by the subject shake detector when said face detector detects the person's face to have moved outside of a screen of a through image.

11. An imaging device as claimed in claim 10, wherein said face detector determines that the person's face is outside of the screen of the through image when the person's face moves outside of an image to be taken during photography.

12. An imaging device as claimed in claim 1, wherein the controller selects only one of said camera shake detector and said subject shake detector to perform a shake detection according to detecting the camera shake or detecting the subject shake, respectively, to input detected shake information to said correction section.

13. An imaging device as claimed in claim 1, wherein the controller selects either of said camera shake detector or said subject shake detector before shake detection.

14. An imaging device as claimed in claim 13, wherein the correction section selects a shake correction method before shake detection.

15. An imaging method for imaging a through image for framing prior to shooting an image of a subject as a still image, said imaging method comprising the steps of:

detecting a camera shake based on a motion of an imaging device;
  detecting a subject shake by comparing a first through image with a second through image which are shot at different time;
  detecting a person's face found in said through images;
  selecting said subject shake detection when said person's face is detected and selecting said camera shake detection when said person's face is not detected; and
  correcting shake by moving a part of an imaging optical system in a plane perpendicular to an optical axis during shooting of said still image according to said camera shake detection or said subject shake detection selected in the previous step.

16. An imaging method as claimed in claim 15, wherein said person's face is detected prior to pressing said shutter button halfway, wherein said camera shake or said subject shake is detected when said shutter button is pressed halfway, and wherein said still image is shot when said shutter button is fully pressed.

17. An imaging method as claimed in claim 15, wherein said detecting said subject shake is performed by a subject shake detector and is selected to perform a shake detection instead of by said detecting said camera shake performed by a camera shake detector only when said person's face is detected by a face detector, and said detecting said camera shake is selected and performed by said camera shake detector only when said face detector does not detect the person's face.

* * * * *